June 23, 1953  R. R. STEVENS  2,642,845

PISTON CUSHIONING APPARATUS

Filed Dec. 20, 1950

INVENTOR.
Roy R. Stevens
BY
Frank E. Miller,
ATTORNEY

Patented June 23, 1953

2,642,845

UNITED STATES PATENT OFFICE 2,642,845

PISTON CUSHIONING APPARATUS

Roy R. Stevens, Forest Hills, Pa., assignor to Westinghouse Air Brake Company, a corporation of Pennsylvania Application December 20, 1950, Serial No. 201,855

7 Claims. (Cl. 121—38)

This invention relates to fluid pressure motors employing a piston for operating a device and the principal object of the invention is the provision of improved means for cushioning movement of the piston near the end of the piston stroke to avoid damaging impact within the motor.

Other objects and advantages will become apparent from the following more detailed description of the invention.

Figure 1:
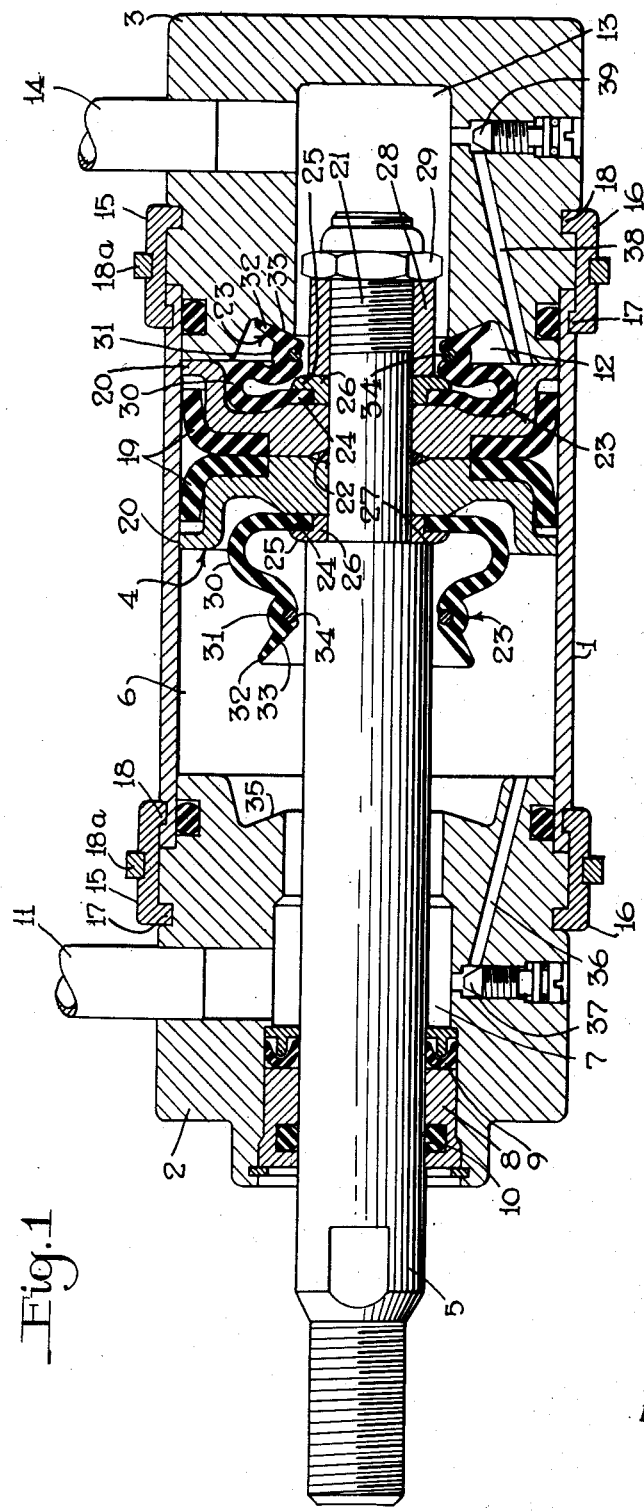
Figure 2:
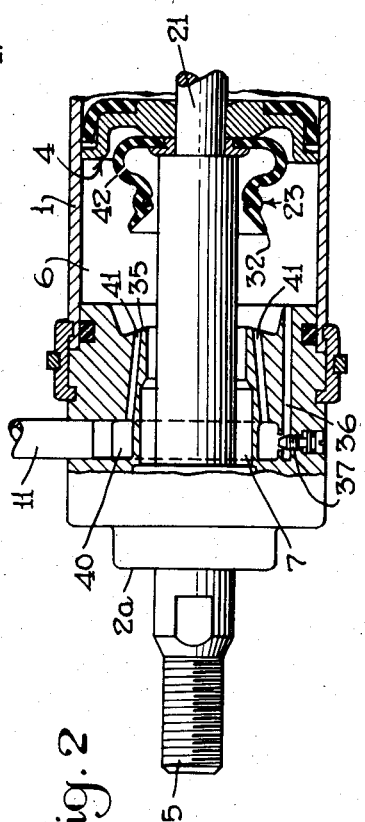

In the accompanying drawing: Fig. 1 is a longitudinal sectional view of a fluid pressure motor embodying the invention; and Fig. 2 is a similar view of a portion of a motor embodying a modification of the invention.

*Description.—Fig. 1*

As shown in the drawing, the fluid pressure motor embodying the invention comprises a cylinder 1, preferably made from a desired length of commercial tubing, pressure heads 2 and 3 closing opposite ends of said cylinder, and a double acting piston 4 reciprocably mounted in said cylinder and having a rod 5 extending through a pressure chamber 6 at one side of said piston, and a relatively large cavity 7, a bearing 8, and suitable seals 9 and 10 in the pressure head 2 to the exterior of the motor for attachment to a device to be operated. The cavity 7 is connected to a pipe 11 through which fluid under pressure is adapted to be supplied to and released from chamber 6. At the opposite side of piston 4 is a pressure chamber 12 connected via a cavity 13 in head 3 to a fluid pressure supply and release pipe 14. Each of the pressure heads 2 and 3 is removably attached to the respective end of cylinder 1 by overlying elements 15, 16 having internal ribs 17, 18 disposed respectively in grooves in said head and cylinder and held in place by a contractable encircling element 18a. This attaching structure constitutes the invention of Fred S. Whaley disclosed and claimed in his copending application, Serial No. 201,812 filed December 20, 1950 and assigned to the assignee of the present application.

The piston 4 comprises two oppositely arranged and like flexible packing cups 19 slidably engaging the interior wall of the cylinder for preventing leakage of fluid under pressure between pressure chambers 6 and 12. The cups 19 are carried by and clamped between two oppositely arranged follower plates 20 which are slidably mounted on a reduced portion 21 of the piston rod 5. Between the two plates 20 at their juncture with the reduced portion 21 of rod 5 is a recess containing a sealing ring 22 bearing against said plates and portion of said rod for preventing leakage of fluid under pressure through the piston between chambers 6 and 12.

According to the invention, I provide in each of the pressure chambers 6 and 12 a collapsible bell-like cushioning element 23 encircling the reduced portion 21 of rod 5 and having at the piston end an inwardly extending flange 24 disposed between the piston and a flange 25 of a ring 26 slidably mounted on said portion of said rod, it being noted that the two elements 23 and rings 26 are oppositely arranged with the ring 26 at one side of the piston engaging a shoulder 27 formed at the junction of the reduced portion 21 and main portion of the piston rod. At the opposite side of piston 4 a sleeve 28 is slidably mounted on the reduced portion 21 of rod 5 with one end engaging the respective ring 26 and the other end engaging a nut 29 screw-threaded on said reduced portion. Tightening of the nut 29 against sleeve 26 secures all parts mounted on the reduced portion 21 of rod 5 in contact with each other and clamps the packing cups 19 and adjacent flanges 24 of the elements 23 in position.

Each of the elements 23 comprises an annular corrugation 30 the flange 24 of which constitutes one inwardly extending leg of the corrugation while connected to the edge of the other leg through a thickened portion 31 is an outwardly flaring annular lip 32 the outer annular face 33 of which constitutes a valve. Encircling the rod 5 and substantially embedded in the thickened portion 31 is a metal support ring 34. The heads 2 and 3 are each provided with an annular seat 35 for sealing engagement by the valve face 33 of lip 32 for closing communication between cavity 7 and the portion of pressure chamber 6 encircling the respective element 23 or cavity 13 and the portion of pressure chamber 12 encircling the other element 23, as the case may be. The cavity 7 in head 2 is open through a passageway 36 restricted by an adjustable throttle valve 37 to pressure chamber 6 at a point outside of the annular lip seat 35. Similarly, pressure chamber 12 is open through a passageway 38 restricted by an adjustable throttle valve 39 to cavity 13 in head 3.

In operation, let it be assumed that the motor is void of fluid under pressure, that the parts are in the position in which they are shown in the drawing and that while retaining pipe 11 vented, fluid under pressure is supplied to pipe 14.

Fluid under pressure thus supplied to pipe 14 will flow to cavity 13 in head 3 and thence to the interior of the adjacent element 23 and also below the respective valve lip 32 from its seat 35 and flow into chamber 12 encircling said element, at the same time fluid under pressure also flowing to chamber 12 from cavity 13 via passage 38. The piston 4 will thus be subjected over its full right-hand face to pressure of fluid supplied thereto and when such pressure becomes sufficient the piston 4 and rod 5 will be moved in the direction of chamber 6. As the piston 4 thus moves the resiliency of element 23 on its right-hand face will hold the lip 32 thereof in substantial contact with its seat 35 until the element obtains a normal unstressed condition in which the other element 23 is shown in the drawing, following which, said lip will be pulled out of contact with the respective valve seat 35 and the element will then move with said piston and during such movement fluid present in chamber 6 will be freely displaced therefrom through cavity 7 in pressure head 2 and pipe 11.

As the piston 4 then continues to move toward the left-hand the lip 32 of element 23 on the left-hand face of said piston will contact the respective seat 35 some distance ahead of termination of the piston stroke. This engagement of the left-hand element 23 with its seat 35 closes communication between the portion of chamber 6 encircling said element and the portion of said chamber within said element which remains open to cavity 7 in the head 2, as a result of which, the fluid in the portion of said chamber encircling said element will be compressed as the piston continues to move to provide a back pressure on said piston which will act to slow it down and prevent damaging impact as said piston is finally stopped by engagement between the left-hand follower 20 and adjacent face of pressure head 2. The degree of such back pressure will be regulated by the adjustment of the throttle valve 37 which controls a leak via passageway 36 through which fluid under pressure may be dissipated from the portion of chamber 6 encircling the respective element 23. It will be apparent that proper adjustment of the throttle valve will provide any desired degree of cushion for the piston 4.

On the other hand, if the piston 4 is at the left-hand end of cylinder 1 and fluid under pressure is supplied to pipe 11 while venting pipe 14 the element 23 on the right-hand face of piston 4 will provide a cushion to limit impact against the pressure head 3, as will be apparent from the above description.

In the structure shown in Fig. 1, it will be noted that only the portion of chamber 6 or 12 encircling the respective element 23 and the exposed area of piston 4 is effective to provide a cushion to dampen movement of said piston since the interior of said element and exposed surface of said piston is freely open to atmosphere through pipe 11 or 14, as the case may be. It will be further noted that the cushioning effect just mentioned may be slightly reduced due to the collapse of the element corrugation 30 against the respective follower 20. While not considered material, this reduction in cushioning effect may however be avoided by the structure shown in Fig. 2.

*Description.—Fig. 2*

While only approximately one-half of the motor is shown in this view, it is to be understood that the following description will apply to both of the cylinder pressure heads for said motor.

The numeral 2A designates a pressure head corresponding to head 2 in Fig. 1 but differing therefrom in that cavity 7 is not open directly to pipe 11. In this modification the pipe 11 is open to a cavity 40 encircling the cavity 7, the cavity 40 being open through a plurality of passageways 41 to the seat 35 for the lip 32 of the respective element 23. The leak passage 36 in this instance is open past the throttle valve 37 to cavity 40 and an equalizing port or hole 42 is provided through the corrugation 30 of element 23 opening the interior to the exterior thereof.

In operation, when the valve 32 engages its seat 35, all communication between chamber 6 and the head cavity 7 is closed to pipe 11 except the leak past the throttle valve 37 whereby the full area of piston 4 is subject to pressure of cushioning fluid and the collapse of the valve 21 against the adjacent follower plate 20 will have no effect upon cushioning.

When fluid under pressure is supplied to pipe 11 to move the piston 4 in the direction of chamber 12, such fluid under pressure will flow through cavity 40 and ports 41 to the valve lip 32 and blow same off seat 35 to obtain ingress to chamber 6 and at the same time enter said chamber through passageway 36 past the throttle valve 37.

*Summary*

It will now be seen that I have provided a relatively simple structure for cushioning final movement of a power actuated piston. The seat 35 against which the valve 21 seats needs not to be machined and close concentricity between said seat and the piston rod are not essential to effective operation of the invention since the valve lip 32 will automatically adjust itself to said seat.

Having now described my invention, what I claim as new and desire to secure by Letters Patent, is:

1. In a fluid pressure motor, the combination with a cylinder, heads closing opposite ends of said cylinder, a piston in said cylinder movable by fluid under pressure supplied to a chamber between said piston and one of said heads in the direction of the other head, a passageway in said other head through which fluid is adapted to be displaced from a chamber at the opposite side of said piston upon said movement of said piston, a normally extended compressible bell like annular element secured at one end to said piston and projecting therefrom with an opposite open end arranged for engagement with said other head around the opening of said passageway to the last named chamber from an intermediate position of said piston in said cylinder to the end of the piston stroke during said movement of said piston, and a constantly open restricted passage open to the last named chamber outside said element providing a leak for fluid therefrom.

2. In a fluid pressure motor, the combination with a cylinder, heads closing opposite ends of said cylinder, a piston in said cylinder movable by fluid under pressure supplied to a chamber between said piston and one of said heads in the direction of the other head, a passageway in said other head through which fluid is adapted to be displaced from a chamber at the opposite side of said piston upon said movement of said piston, a normally extended compressible bell like annular element secured at one end to said piston and projecting therefrom and comprising at an opposite open end an annular valve, a valve seat on said other head around the opening of said passageway for engagement by said valve during said movement of said piston from an intermediate position in said cylinder to the end of its stroke during said movement of said piston, and a constantly open restricted passage in said other head open to the last named chamber outside of said valve seat.

3. In a fluid pressure motor, the combination with a cylinder, heads closing opposite ends of said cylinder, a piston in said cylinder movable by fluid under pressure supplied to a chamber between said piston and one of said heads in the direction of the other head, a passageway in said other head through which fluid is adapted to be displaced from a chamber at the opposite side of said piston upon said movement of said piston, a normally extended compressible annular bell like element secured at one end to said piston and projecting therefrom and comprising at an opposite open end an annular flexible lip having a frustro-conical valve face, and a complementary valve seat in said head around the opening of said passageway to the last named chamber for engagement by said lip during said movement of said piston from an intermediate position in said cylinder to the end of its stroke, and a constantly open restricted passage in said other head open to the last named chamber outside of said valve seat.

4. In a fluid pressure motor, the combination with a cylinder, heads closing opposite ends of said cylinder, a piston in said cylinder movable by fluid under pressure supplied to a chamber between said piston and one of said heads in the direction of the other head, an annular valve seat on said other head in a chamber at the opposite side of said piston and arranged coaxially to said piston, a passageway in said other head open to the interior of said seat through which fluid is adapted to be displaced by said movement of said piston from the last named chamber, a compressible circular bellows-like element in the last named chamber arranged in coaxial relation to said piston and secured at one end thereto and open at the opposite end and comprising a valve encircling the opening at said opposite end and arranged to engage said seat from an intermediate position of said piston in said cylinder to the end of the piston stroke during said movement of said piston, and a constantly open restricted passageway in said other head open to the last named chamber outside of said valve seat.

5. In a fluid pressure motor, the combination with a cylinder, heads closing opposite ends of said cylinder, a piston in said cylinder movable by fluid under pressure supplied to a chamber between said piston and one of said heads in the direction of the other head, a passageway in said other head through which fluid is adapted to be displaced by said movement of said piston from a chamber between said piston and said other head, an annular valve seat on said other head in the last named chamber arranged coaxial to said piston and encircling the end of said passageway, a compressible circular bellows-like element in the last named chamber secured at one end to said piston in coaxial relation therewith and open at the opposite end and comprising a valve encircling the opening at said opposite end and arranged to engage said seat from an intermediate position of said piston in said cylinder to the end of the piston stroke during said movement of said piston, and a constantly open restricted passageway in said other head open to the last named chamber outside of said valve seat.

6. In a fluid pressure motor, the combination with a cylinder, heads closing opposite ends of said cylinder, a piston in said cylinder movable by fluid under pressure supplied to a chamber between said piston and one of said heads in the direction of the other head, an annular valve seat on the other head arranged coaxial to said piston in a chamber between said piston and said other head, a plurality of passageways open to said seat through which fluid displaced by said movement of said piston is adapted to escape from the last named chamber, a compressible bellows-like element in the last named chamber secured at one end to said piston in coaxial relation therewith and comprising at the opposite end a flexible valve adapted to engage said seat over said passageways from an intermediate position of said piston in said cylinder to the end of the piston stroke during said movement of said piston, a constantly open leak port connecting the interior to the exterior of said element, and a constantly open restricted passageway in said other head open to the last named chamber outside of said valve seat.

7. In a fluid pressure motor, the combination with a cylinder, heads closing opposite ends of said cylinder, a piston in said cylinder movable by fluid under pressure supplied to a chamber between one of said heads and one side of said piston to displace fluid from a second chamber between the opposite side of said piston and the other of said heads, a passageway in said other head through which fluid is adapted to be displaced from said second chamber, a flexible bellows-like element in said second chamber secured at one end to said piston in coaxial relation thereof and adapted to engage said other head around said passageway from an intermediate position of said piston in said cylinder to the end of the piston stroke during said movement of said piston, a constantly open restricted passageway in said other head open to said second chamber outside of the portion of said other head engageable by said element, and a rigid ring secured to a convolution of said element for supporting said element against collapse.

ROY R. STEVENS.

References Cited in the file of this patent

UNITED STATES PATENTS

| Number | Name | Date |
|---|---|---|
| 845,827 | Steedman | Mar. 5, 1907 |
| 2,411,748 | Kelley | Nov. 26, 1946 |
| 2,452,176 | Bent | Oct. 26, 1946 |
| 2,556,698 | Loewe | June 12, 1951 |